US010458466B2

(12) United States Patent
Hird (10) Patent No.: US 10,458,466 B2
(45) Date of Patent: Oct. 29, 2019

(54) NON SYMMETRICAL BI-DIRECTIONAL THRUST BEARING WITH TWO ACTIVE FACES

(71) Applicant: Siemens Aktiengesellschaft, Munich (DE)

(72) Inventor: James Hird, Gainsborough (GB)

(73) Assignee: Siemens Aktiengesellschaft, Munich (DE)

( * ) Notice: Subject to any disclaimer, the term of this patent is extended or adjusted under 35 U.S.C. 154(b) by 439 days.

(21) Appl. No.: 15/034,946

(22) PCT Filed: Oct. 27, 2014

(86) PCT No.: PCT/EP2014/072971
§ 371 (c)(1),
(2) Date: May 6, 2016

(87) PCT Pub. No.: WO2015/071078
PCT Pub. Date: May 21, 2015

(65) Prior Publication Data
US 2016/0265586 A1    Sep. 15, 2016

(30) Foreign Application Priority Data

Nov. 13, 2013   (EP) ..................................... 13192642

(51) Int. Cl.
*F01D 25/16*    (2006.01)
*F01D 25/24*    (2006.01)
(Continued)

(52) U.S. Cl.
CPC ............ *F16C 17/06* (2013.01); *F01D 25/162* (2013.01); *F01D 25/24* (2013.01); *F16C 17/107* (2013.01);
(Continued)

(58) Field of Classification Search
CPC .... F01D 25/162; F01D 25/24; F05D 2220/32; F05D 2240/52; F16C 17/06; F16C 17/107; F16C 2360/23
See application file for complete search history.

(56) References Cited

U.S. PATENT DOCUMENTS 3,586,401 A    6/1971   Gravelle
3,784,266 A    1/1974   Parlevliet
(Continued)

FOREIGN PATENT DOCUMENTS

CN    1846074 A    10/2006
DE    4414848 C1    7/1995
(Continued)

OTHER PUBLICATIONS

Machine translation of EP 1464855 A1 (Oct. 6, 2004) from Espacenet.*
(Continued)

*Primary Examiner* — Woody A Lee, Jr.
*Assistant Examiner* — Christopher R Legendre
(74) *Attorney, Agent, or Firm* — Beusse Wolter Sanks & Maire (57) ABSTRACT

A bearing device supports a shaft of a gas turbine engine. A first support disk is mounted to the bearing housing element. First tilting pads are tiltably arranged one after another along a circumferential direction at the first support disk. A second support disk is mounted to the bearing housing element spaced apart from the first support disk along an axial direction. Second tilting pads are tiltably arranged one after another along the circumferential direction at the second support disk. A first number of the first tilting pads is greater than the half of a second number of the second tilting pads but smaller than the second number of the second tilting pads.

10 Claims, 5 Drawing Sheets

(51) Int. Cl.
*F16C 17/06* (2006.01)
*F16C 17/10* (2006.01)

(52) U.S. Cl.
CPC ...... *F05D 2220/32* (2013.01); *F05D 2240/52* (2013.01); *F05D 2240/60* (2013.01); *F16C 2240/00* (2013.01); *F16C 2360/23* (2013.01)

(56) References Cited

U.S. PATENT DOCUMENTS

| | | | |
|---|---|---|---|
| 3,905,250 | A | 9/1975 | Sigg |
| 4,026,613 | A * | 5/1977 | Moravchik ............ F16C 17/06 384/308 |
| 8,408,801 | B2 * | 4/2013 | Waki ...................... F01D 25/18 384/307 |
| 9,494,046 | B2 * | 11/2016 | Janssen ..................... F01D 3/04 |
| 2006/0239596 | A1 | 10/2006 | Shepherd |
| 2007/0025839 | A1 | 2/2007 | Ceric et al. |
| 2010/0215299 | A1 * | 8/2010 | Waki ...................... F01D 25/18 384/307 |
| 2011/0123327 | A1 * | 5/2011 | Dewhurst ................ F01D 3/02 415/229 |
| 2014/0147247 | A1 | 5/2014 | Janssen et al. |
| 2016/0265586 | A1 * | 9/2016 | Hird ....................... F16C 17/06 |

FOREIGN PATENT DOCUMENTS

| | | | |
|---|---|---|---|
| DE | 10059196 A1 | 6/2002 | |
| DE | 10059196 C2 | 11/2002 | |
| EP | 1464855 | 10/2004 | |
| EP | 1464855 A1 | 10/2004 | |
| EP | 1479875 A1 | 11/2004 | |
| GB | 309124 A | 3/1930 | |
| GB | 614724 A | 12/1948 | |
| GB | 2402446 A | 12/2004 | |
| GB | 2453143 A | 4/2009 | |
| JP | 2010151283 A * | 7/2010 | .......... F16C 33/1045 |
| JP | 2011169418 A * | 9/2011 | ............. F16C 41/02 |
| RU | 2315211 C2 | 1/2008 | |
| WO | 2004109132 A1 | 12/2004 | |
| WO | 2013011150 A1 | 1/2013 | |

OTHER PUBLICATIONS

Russian Federation decision of grant dated Nov. 22, 2017, for RU patent application No. 2016118415.
CN Office Action dated May 11, 2017, for CN patent application No. 201480062083.5.

* cited by examiner

NON SYMMETRICAL BI-DIRECTIONAL THRUST BEARING WITH TWO ACTIVE FACES

CROSS REFERENCE TO RELATED APPLICATIONS

This application is the US National Stage of International Application No. PCT/EP2014/072971 filed Oct. 27, 2014, and claims the benefit thereof. The International Application claims the benefit of European Application No. EP13192642 filed Nov. 13, 2013. All of the applications are incorporated by reference herein in their entirety.

FIELD OF INVENTION

The present invention relates to a bearing device for supporting a shaft, in particular a rotor stub shaft, of a gas turbine engine and to a gas turbine engine. Furthermore, the present invention relates to a method of supporting a shaft, in particular a rotor stub shaft, of a gas turbine engine.

ART BACKGROUND

A shaft of a gas turbine engine is generally supported by a fluid bearing which are hydrodynamically lubricated. In particular, so called tilting pad bearings may be used for supporting the shaft.

A combined tilting pad bearing module has a three bearing surfaces, one is a rotor journal support for transferring radial forces and two are axial thrusting surfaces, one of which is designated an 'active' side (generally designed for receiving the largest thrust) intended for receiving the axial thrust at the operating point of the gas turbine, and the other is an 'inactive' side (generally designed for receiving a limited thrust) required for brief periods of transient off design conditions of the turbine.

Generally the design intent of bearings of this combined bearing module type with respect to 'inactive' and 'active' sides, is that the bearing is to be used 'directionally', where the 'active' side is arranged relative to a main thrusting direction of the rotor.

Due to instrumentation requirements for some gas turbines as either a result of legislation or customer requirement, which may include but not limited to vibration monitoring or axial displacement probes, a non-symmetrical design (in terms of number of thrust pads and e.g. lubrication nozzles) of bearing may be required to be used, and therefore it will not be possible to have a bearing module with equal thrust capacity on each side of the module, again, determining a bearing 'directionality'.

Over the operational life of the gas turbine (in particular a turbine in a single shaft design), external effects such as temperature/humidity of environment (which affecting inlet conditions), gas turbine filtration/cleanliness or various states of component deterioration/fouling can cause the net thrust balance of the gas turbine to change. Minor changes in net thrust balances causes a variation in thrust loads imparted on these bearings, which would normally be within the capabilities of the bearing modules thrust load ratings and would be no cause for concern. However, significant changes in net thrust balance can cause the engine to operate in the opposite rotor thrust direction with respect to the design intent, where the 'inactive' side of the bearing module effectively becomes the main thrusting side at the operating point, which inherently has less thrust capacity, and has been known to cause failures, as the thrust loads exceeds the bearing module thrust load capacity rating on this side.

GB 309, 124 discloses radial-flow turbines which are arranged in two housings, so that the end-thrusts on the common shaft balance one another. The steam may flow through the radial-flow turbines in series or in parallel. A thrust collar is provided and a driven machine is arranged between the radial-flow turbines.

WO 2013/011150 A1 discloses a rotary machine with a rotor that is mounted in a bearing. The rotor is subjected to a thrust that acts substantially in only an axial direction during the operating time. The thrust is received and dissipated by a first thrust bearing of the bearing via sliding means. The bearing further comprises a second thrust bearing, which generates a force that acts on the first thrust bearing in the direction of the thrust at least temporarily at the same time as the thrust occurs.

EP 1 479 875 A1 discloses a bearing for an axial support of a gas turbine rotor. The bearing has a bearing component in which is installed a hydraulic piston arrangement with which communicates a hydraulic system. Restrictors and flow control valves are interposed between the hydraulic piston and hydraulic system and may be installed in the bearing component. The hydraulic piston arrangement has a number of pistons installed in respective piston chambers which are constructed as cylindrical bores.

U.S. Pat. No. 3,784,266 discloses a hydrodynamic pivoted segmental thrust bearing which comprises centrally supported, pivoted bearing segment including at least one elongated lubricating fluid collection groove disposed in a bearing surface of the segment adjacent and parallel to at least one of the radial edges thereof. The bearing segment further including at least one fluid outlet aperture disposed through the segment opening at one end into the groove and at the other end into the thrust bearing well of the bearing. The collection groove drains fluid from the bearing surface into a bearing well, and interrupts the formation of the bearing surface lubricating fluid film, thereby reducing an effective bearing surface on one side of the segment.

GB 2 453 143 A discloses a thrust bearing comprising a high melting-temperature thrust collar and thrust pad. Mutually facing surfaces of the collar and pad are coated with a coating of high hardness and low coefficient of friction. The substrate is preferably steel and the coating is preferably a ceramic coating, more preferably a carbon-enriched tungsten carbide coating. The invention is chiefly applicable to the thrust bearing of a turbocharger.

SUMMARY OF THE INVENTION

It may be an object of the present invention to provide a bearing for a gas turbine rotor stub shaft, which bearing may receive high axial thrust in both axial directions.

This object is solved by a bearing device for supporting a shaft, in particular a rotor stub shaft, of a gas turbine engine, by a gas turbine engine and by a method of supporting a shaft, in particular a rotor stub shaft, of a gas turbine engine according to the independent claims.

According to a first aspect of the present invention a bearing device for supporting a shaft, in particular a rotor stub shaft, of a gas turbine engine is presented. The thrust bearing device comprises a bearing housing element and a first support disk which is mounted to the bearing housing element. The bearing device further comprises first tilting pads, which are tiltably arranged one after another along a circumferential direction at the first support disk. The bearing device further comprises a second support disk which is mounted to the bearing housing element spaced apart from the first support disk along an axial direction. The bearing device further comprises second tilting pads, which are tiltably arranged one after another along the circumferential direction at the second support disk.

The first tilting pads are arranged with respect to a first thrust collar mounted to the shaft such that a first axial thrust is transferrable from the first thrust collar to the first tilting pads. The second tilting pads are arranged with respect to a second thrust collar mounted to the shaft such that a second axial thrust which is orientated in opposite direction with respect to the first axial thrust is transferrable from the second thrust collar to the second tilting pads.

A first number of the first tilting pads is greater than the half of a second number of the second tilting pads but smaller than the second number of the second tilting pads.

According to a further aspect of the present invention, a gas turbine engine comprising a gas turbine housing, a shaft, a first thrust collar which is mounted to the shaft, a second thrust collar which is mounted to the shaft and the above described bearing device is described. The first thrust collar is arranged spaced apart from the second thrust collar along an axial direction. The bearing housing element is mounted to the gas turbine housing.

According to a further aspect of the present invention, a method of supporting a shaft of a gas turbine engine by the above described bearing device is described. The first axial thrust is transferred from the first thrust collar to the first tilting pads. The second axial thrust which is orientated in opposite direction with respect to the first axial thrust is transferred from the second thrust collar to the second tilting pads.

The gas turbine engine comprises an upstream rotating compressor coupled to a downstream turbine, and a combustion chamber in-between. A shaft couples the upstream rotating compressor with the downstream turbine. In some embodiments, a twin shaft design is provided, wherein two shafts are arranged within the gas turbine engine which are coupled e.g. by a gear.

The terms upstream and downstream refer to the flow direction of the airflow and/or working gas flow through the gas turbine engine unless otherwise stated. The terms forward and rearward refer to the general flow direction of gas through the engine. The terms axial, radial and circumferential are made with reference to a rotational axis of the shaft of the gas turbine engine.

The shaft of the gas turbine engine is rotatably supported by the above described bearing device. In particular, the above described bearing device receives axial thrust acting along the axial direction of the shaft. The axial thrust is transferred from the shaft to the first and second support disks, respectively, by the first and second tilting pads, respectively.

A first thrust collar and a second thrust collar is fixed to the shaft and hence rotate together with the shaft around the rotational axis. The respective thrust collar may comprise a contact surface for providing a sliding contact with the respective tilting pads, wherein the contact surface has a normal which may be approximately parallel to the axial direction.

Accordingly, the tilting pads comprise respective contact surfaces for providing the sliding contact with the respective thrust collars.

The tilting pads are arranged onto a respective supporting surface of a respective support disk. The respective support surface may comprise a normal which is approximately parallel to the axial direction. The tilting pads are pivotable disposed on the respective support disk and the respective supporting surfaces. Additionally, the support disk comprises holding elements for the tilting pads, wherein the holding elements holds the tilting pads in such a way that the tilting pads cannot slide uncontrolled along the circumferential or radial direction. The holding elements may be for example guiding rails or other downholding elements for holding the tilting pads onto the supporting surface of the support disk without preventing a tilting of the tilting pad.

The supporting surface may comprise for example steel pins onto which the tilting pads are located, wherein the steel pins provide a contact point with the tilting pads such that the tilting pads pivot.

The first support disk and the second support disk are fixed to a housing element which is part of the bearing housing. The bearing device may comprise an intermediate disk portion which is arranged between the first and second support disk, for example. The bearing housing is fixed to a gas turbine fundament, for example. The bearing housing forms a thrust bearing well which encloses the first tilting pads and the first thrust collar for lubricating the sliding surface between the first tilting pads and the first thrust collar. Accordingly, the bearing housing forms a further thrust bearing well which encloses the second tilting pads and the second thrust collar for lubricating the sliding surface between the second tilting pads and the second thrust collar.

Due to the rotation of the thrust collars with respect to the respective tilting pads and due to the slewability of the tilting pads, a wedge shaped film of lubricating fluid, which decreases in thickness in the direction of rotation of the thrust collar is formed and hence a better lubrication is achieved.

By the approach of the present invention, a bearing device with non-symmetrical arrangements and non-equal amounts of bearing pads is provided. It has been found out, that by providing the first tilting pads with a first number greater than the half of a second number of the second tilting pads but smaller than the second number of the second tilting pads, a bearing device which can receive an axial thrust in a bi-directional force direction as designed for a specific/required thrust capacity of the intended gas turbine product.

Because it is not practical and cost effective to monitor the thrust balance of the turbine engine over the operational life and then, as a reactive measure, instruct shut down the turbine engine for maintenance to replace the bearing 'on condition of requirement', by the inventive bearing device the first tilting pads and the second tilting pads have almost the same wear, so that in one common maintenance step the first and the second tilting pads may be replaced for maintenance reasons.

By the inventive bearing device, a non-symmetrical tilting pad configuration is provided which is designed bidirectional in terms of rotor axial thrust by having two 'active' thrust sides (of differing thrust capacities), rather than an 'active' and 'inactive' side which would previously define the directionality of the bearing. The implications of having two 'active' sides (namely the first support disk with the first tilting pads and the second support disk with the second tilting pads) is that the bearing device can withstand known axial thrusts in both thrusting directions.

According to an exemplary embodiment of the present invention, the bearing device further comprises at least three journal pads which are mounted to the first support disk and the second support disk spaced apart from each other along the circumferential direction. The three journal pads are arranged between the first support disk and the second support disk such that a radial force is transferrable between the three journal pads and the shaft and such that the shaft is rotatable with respect to the three journal pads. The journal pads may be exchangeably fixed to the first and/or second support disk. Specifically, the journal pads may be fixed to the intermediate disk between the first and the second support disk.

According to a further exemplary embodiment, the first support disk comprises the first support surface onto which the first tilting pads are arranged. The first support disk comprises at least one spacer element which protrudes from the first surface along the axial direction. The spacer element is further arranged such that the spacer element is arranged between two adjacent first tilting pads for preventing a contact of the two adjacent first tilting pads. The spacer element may be a part of the above described holding element, for example.

According to a further exemplary embodiment, the at least one spacer element is a blanked nozzle, such as a pin.

According to a further exemplary embodiment, the at least one spacer element is an oil lubrication nozzle for injecting oil such that a lubrication oil film between the tilting pads and the thrust collar is generatable. The oil lubrication nozzle is coupled to an oil lubrication system which supplies a lubricant under high-pressure to the respective oil lubrication nozzle for generating an oil film between the tilting pads and the respective thrust collars.

Accordingly, also the second support disk may comprise a second support surface onto which the second tilting pads are arranged. The second support disk comprises at least one further spacer element which protrudes from the second surface along the axial direction. The further spacer element is further arranged such that the further spacer element is arranged between two adjacent second tilting pads for preventing a contact of the two adjacent first tilting pads. The further spacer element may be a blanked nozzle, such as a pin, or an oil lubrication nozzle.

According to a further exemplary embodiment, the first tilting pads are unequally distributed onto the first support surface along the circumferential direction. An unequal distribution of first tilting pads denotes that a gap size between two adjacent first tilting pads varies and is hence different to another gap size between other two adjacent first tilting pads.

According to a further exemplary embodiment, more than ⅔ of the first tilting pads are arranged onto a first half of the first support disk and less than ⅓ of the first tilting pads are arranged onto a second half of the first support disk.

According to a further exemplary embodiment, the second tilting pads are equally distributed onto a second support surface of the second support disk along the circumferential direction. An equal distribution of second tilting pads denotes that a gap size between two adjacent second tilting pads is equal to another gap size between other two adjacent second tilting pads.

According to a further exemplary embodiment, the first amount of the first tilting pads is approximately 6 to 11, preferably 8, and a second amount of the second tilting pads is 10 to 21, preferably 12.

The inventive bearing device has an optimized thrust capacity for the intended gas turbine product use, such that the bearing device has a reduced biased 'directional nature' because of the load capability of each side (support disk), and therefore can be considered to have two 'active' thrust sides and thus used for a 'bi-directional' application.

For this particular design, the optimisation of the thrust capacity is achieved by addition of additional tilting pads and e.g. the use of different arrangements of oil lubrication nozzles, blanked and unblanked, to ensure/maintain the preexisting gas turbine product bearing lubrication and drainage requirements.

By having a bearing module operated in this manner, this bi-directionality allows a common design to be used between single and twin shaft configurations of the gas turbine engine and allows the single shaft to operate with any variation in rotor thrust either in thrust load or counter direction, whilst maintaining e.g. API (American Petroleum Institute) compliance in either rotor thrusting direction.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

The illustrations in the drawings are schematic. It is noted that in different figures similar or identical elements are provided with the same reference signs.

Figure 1:
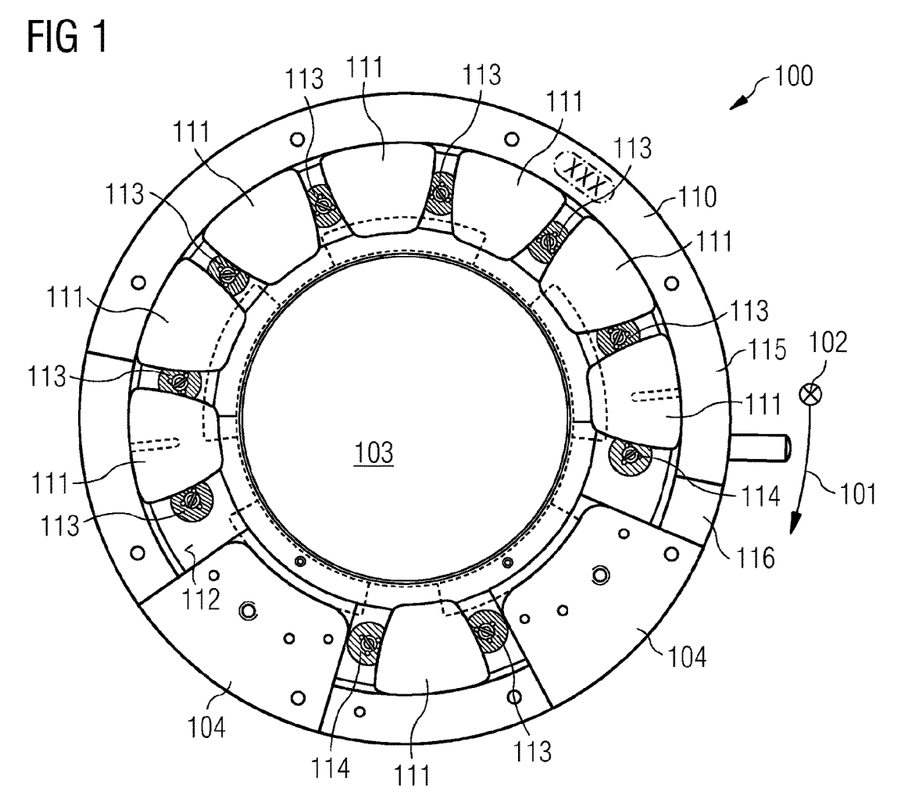
FIG. 1 shows a schematic front view of a first support disk of a bearing device according to an exemplary embodiment of the present invention.
Figure 2:
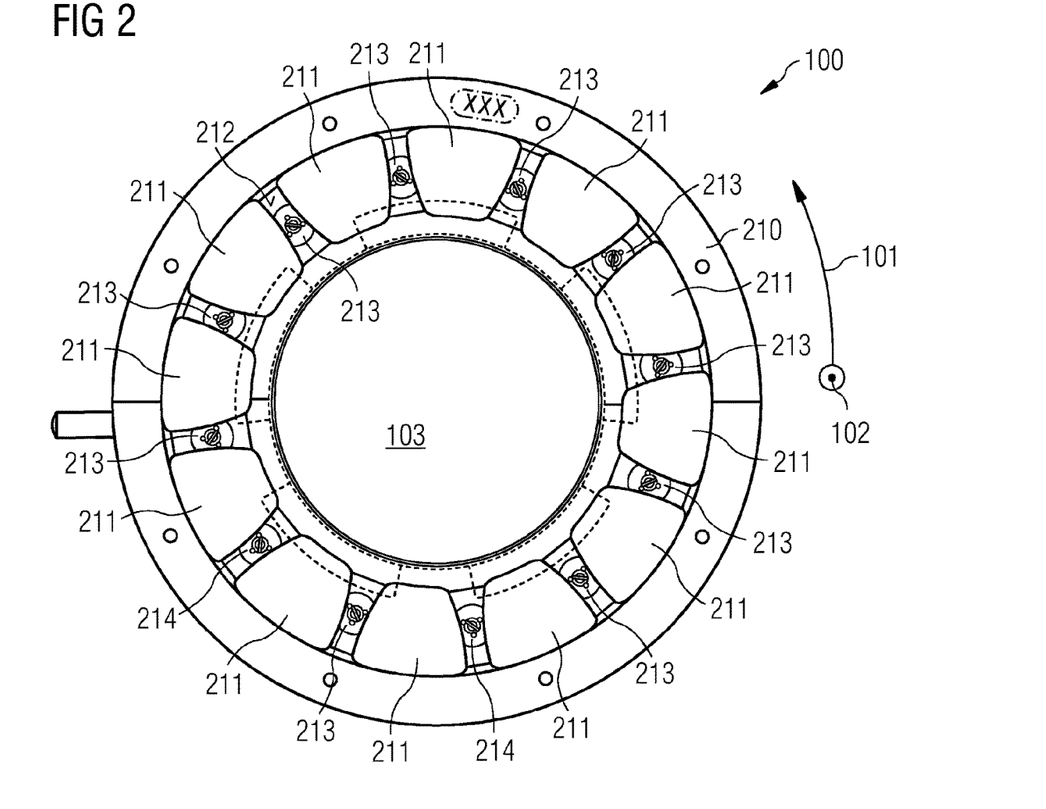
FIG. 2 shows a schematic front view of a second support disk of a bearing device according to an exemplary embodiment of the present invention.

FIG. 1 shows a front view of a first support disk 110 of a bearing device 100 according to an exemplary embodiment of the present invention and FIG. 2 shows a front view of a second support disk 210 of the bearing device 100.

Figure 3:
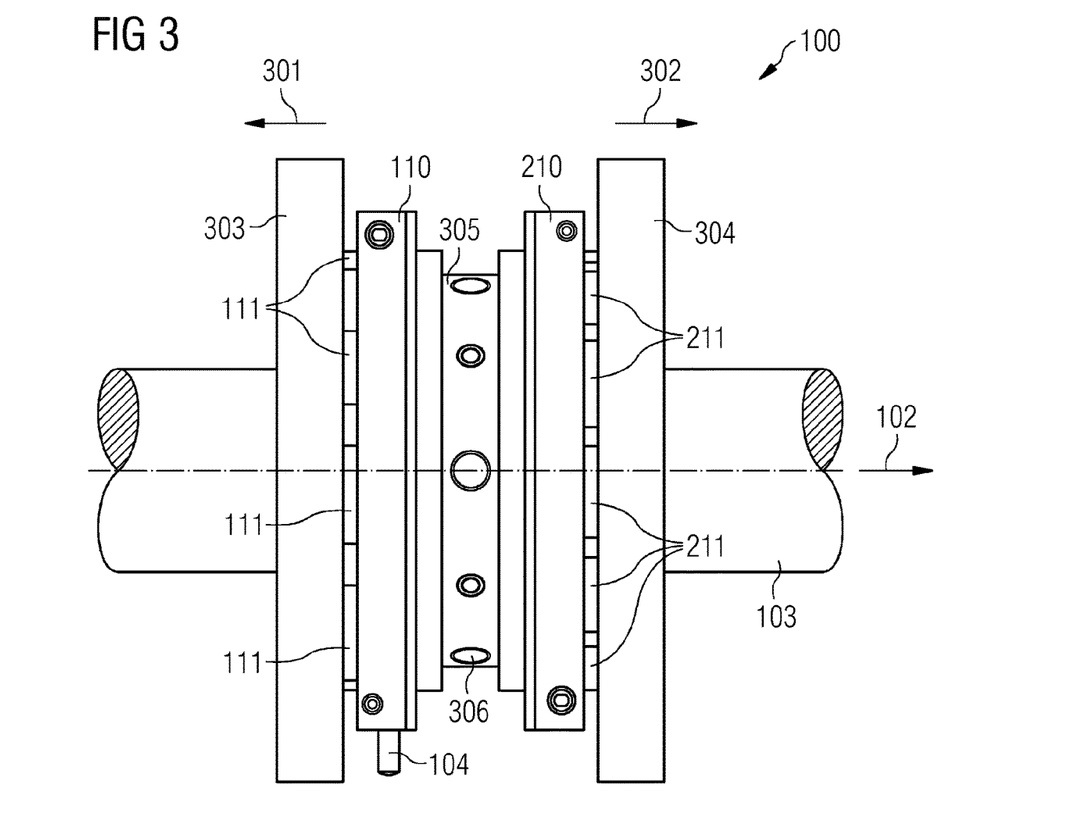
FIG. 3 shows a side view of the bearing device 100 comprising the first support disk 110 shown in FIG. 1 and the second support disk 210 shown in FIG. 2.

In FIG. 3, a side view of the bearing device 100 comprising the shows a side view of the bearing device 100 comprising the first support disk 110 shown in FIG. 1 and the second support disk 210 shown in FIG. 2.

The bearing device 100 for supporting a shaft 103 of a gas turbine engine 10 comprises a first support disk 110 which is mounted to the bearing housing element 104. First tilting pads 111 are tiltably arranged one after another along a circumferential direction at the first support disk 110. A second support disk 210 is mounted to the bearing housing element spaced apart from the first support disk 110 along an axial direction 102. Second tilting pads 211 are tiltably arranged one after another along the circumferential direction at the second support disk 210. A first number of the first tilting pads 111 is greater than the half of a second number of the second tilting pads 211 but smaller than the second number of the second tilting pads 211.

The shaft 103 of the gas turbine engine 10 is rotatably supported by the described bearing device 100. In particular, the bearing device 100 receives axial thrust 301, 302 acting along the axial direction 102 of the shaft 103. The axial thrust 301, 302 is transferred from the shaft 103 to the first and second support disks 110, 210, respectively, by the first and second tilting pads 111, 211, respectively.

A first thrust collar 303 and a second thrust collar 304 are fixed to the shaft 103 and hence rotate together with the shaft 103 around the rotational axis. The respective thrust collar 303, 304 comprises a contact surface for providing a sliding contact with the respective tilting pads 111, 211, wherein the contact surface has a normal which is approximately parallel to the axial direction 102.

Accordingly, the tilting pads 111, 211 comprise respective contact surfaces for providing the sliding contact with the respective thrust collars 303, 304.

The tilting pads 111, 211 are arranged onto a respective supporting surface 112, 212 of a respective support disk 110, 210. The respective support surface 112, 212 comprises a normal which is approximately parallel to the axial direction 102. The tilting pads 111, 211 are pivotable disposed onto the respective support disk 111, 211 and the respective supporting surfaces 112, 212. Additionally, the support disk 111, 211 comprises holding elements for the tilting pads, wherein the holding elements holds the tilting pads 111, 211 in such a way that the tilting pads 111, 211 cannot slide uncontrolled along the circumferential 101 or radial direction.

The first support disk 110 and the second support disk 210 are fixed to a bearing housing element 104 which is part of bearing housing.

The bearing device comprises an intermediate disk portion 305 (see FIG. 3) which is arranged between the first and second support disk 110, 210, for example. The bearing housing is fixed to a gas turbine fundament, for example. The bearing housing forms a thrust bearing well (not shown) which encloses the first tilting pads 111 and the first thrust collar 303 for lubricating the sliding surface between the first tilting pads 111 and the first thrust collar 303.

Accordingly, the bearing housing forms a further thrust bearing well which encloses the second tilting pads 211 and the second thrust collar 304 for lubricating the sliding surface between the second tilting pads 210 and the second thrust collar 304.

Due to the rotation of the thrust collars 303, 304 with respect to the respective tilting pads 111, 211 and due to the slewability of the tilting pads 111, 211, a wedge shaped film of lubricating fluid, which decreases in thickness in the direction of rotation of the thrust collars 303, 304 is formed and hence a better lubrication is achieved.

By the approach of the present invention, a bearing device 100 with non-symmetrical arrangements and non-equal amounts of tilting pads 111, 211 is provided. By providing the first tilting pads 111 with a first number greater than the half of a second number of the second tilting pads 211 but smaller than the second number of the second tilting pads 211, a bearing device 100 which can receive an axial thrust 301, 302 in an bi-directional force direction designed for a specific/required thrust capacity of the intended gas turbine product.

The first support disk comprises the first support surface 112 onto which the first tilting pads 111 are arranged. The first support disk 110 comprises at least one spacer element (a blanked nozzle 114 or an oil lubrication nozzle 113) which protrudes from the first surface 112 along the axial direction 102. The spacer element is further arranged such that the spacer element is arranged between two adjacent first tilting pads 111 for preventing a contact of the two adjacent first tilting pads 111. The at least one spacer element is a blanked nozzle 114, such as a pin, or an oil lubrication nozzle 113 for injecting oil such that a lubrication oil film between the tilting pads 111 and the first thrust collar 303 is generatable. The oil lubrication nozzle 113 is coupled to an oil lubrication system which supplies a lubricant under high-pressure to the respective oil lubrication nozzle 113.

The blanked nozzle 114 are arranged in particular after the respective first tilting pads 111 with respect to a direction of rotation (indicated with arrow 101) and hence on a trailing edge of the tilting thrust pad 111, as this will be to no detriment to the lubrication performance.

Accordingly, as can be taken from FIG. 2, also the second support disk 210 may comprise a second support surface 212 onto which the second tilting pads 211 are arranged. The second support disk 210 comprises at least one further spacer element which protrudes from the second surface 212 along the axial direction. The further spacer element is further arranged such that the further spacer element is arranged between two adjacent second tilting pads 211 for preventing a contact of the two adjacent first tilting pads 211. The further spacer element may be a further blanked nozzle 214, such as a pin, or an oil lubrication nozzle 213.

As can be taken from FIG. 1, the first tilting pads 111 are unequally distributed onto the first support surface 112 along the circumferential direction 101. An unequal distribution of first tilting pads 111 denotes that a gap size between two adjacent first tilting pads 111 varies and is hence different to another gap size between other two adjacent first tilting pads 111.

According to a further exemplary embodiment, more than ⅔ of the first tilting pads 111 are arranged onto a first half of the first support disk 110 and less than ⅓ of the first tilting pads 111 are arranged onto a second half of the first support disk 110.

The second tilting pads 210 are equally distributed onto a second support surface 212 of the second support disk 210 along the circumferential direction 101.

Specifically, according to the exemplary embodiment shown in FIG. 1 and FIG. 2, the first amount of the first tilting pads is 8 and a second amount of the second tilting pads 210 is 12.

As shown in FIG. 3, the intermediate disk portion 305 which is arranged between the first and second support disk 110, 210. A lubricant inlet 306 may be formed within the intermediate disk portion 305. From the lubricant inlet 306, the lubricant may be injected and guided to the oil lubricant nozzles 113, 213.

Furthermore, the bearing device 100 is shown in an operating state, where the first axial thrust 301 is larger than the second axial thrust 302. Hence, the first tilting pads 111 are in sliding contact with the first thrust collar 303 which rotates together with the shaft 103. Hence, a gap exists between the second tilting pads 211 and the second thrust collar 303.

Figure 4:
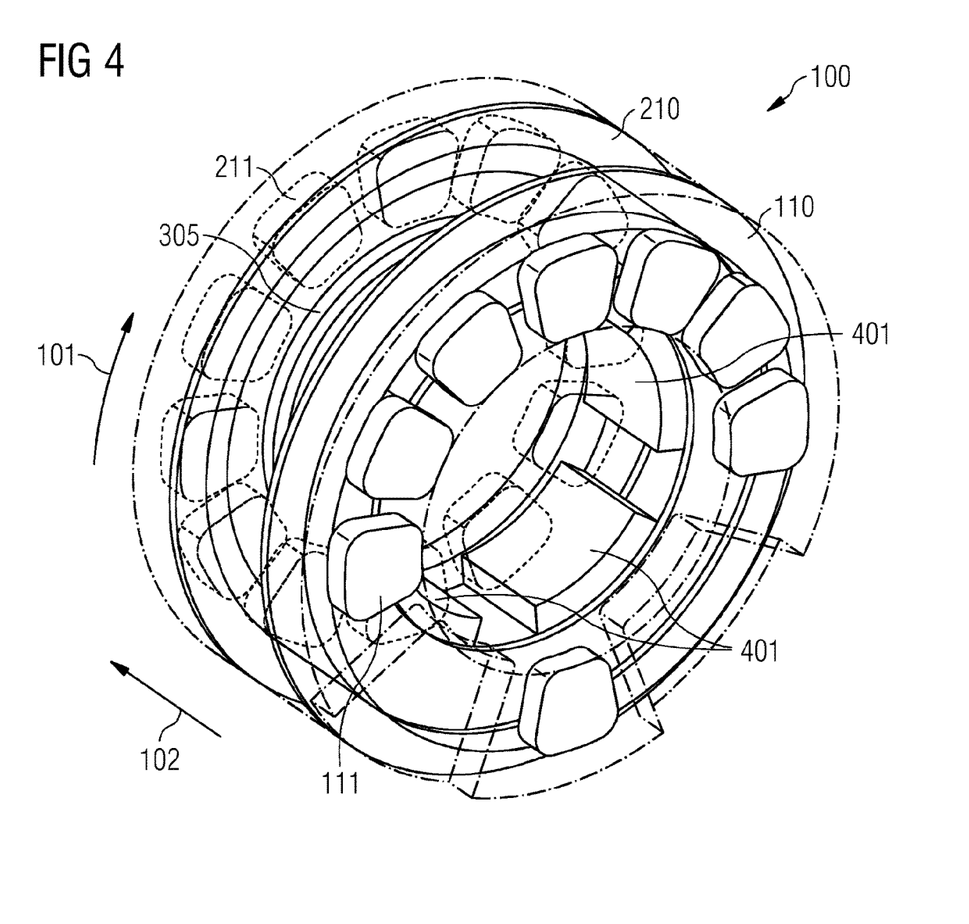
FIG. 4 shows a perspective view of a bearing device according to an exemplary embodiment of the present invention.

FIG. 4 shows a perspective view of the bearing device 100 as shown in FIG. 1 to FIG. 3.

In FIG. 4 are shown three journal pads 401 which are mounted to the first support disk 110, to the intermediate disk 305 and/or the second support disk 210. The journal pads 401 are arranged spaced apart from each other along the circumferential direction. The three journal pads 401 are arranged between the first support disk 110 and the second support disk 210 such that a radial force is transferrable between the three journal pads 401 (and hence the bearing device 100) and the shaft 103, wherein the shaft 103 is rotatable with respect to the three journal pads 401. The journal pads 401 may be exchangeably fixed.

Figure 5:
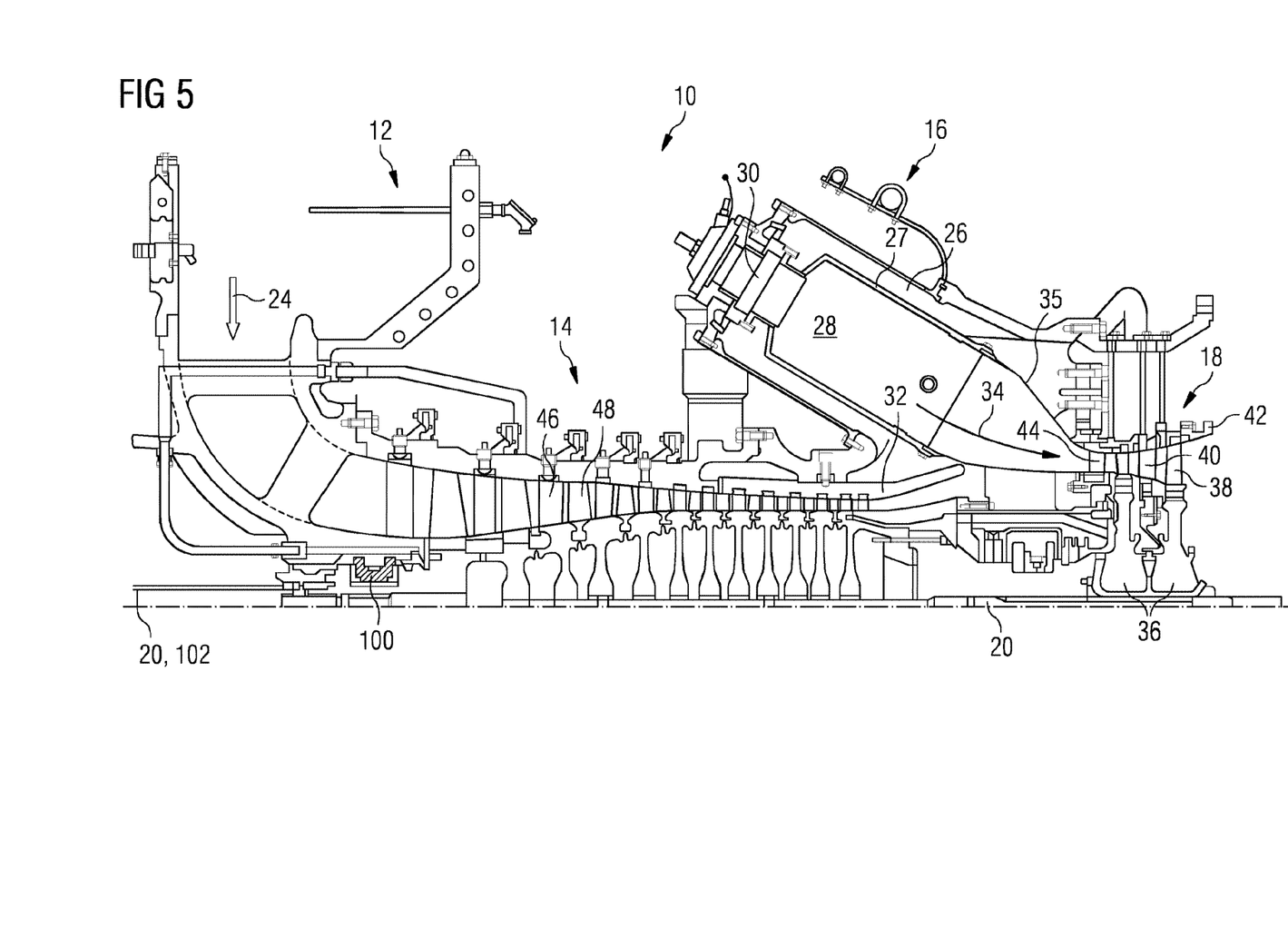
FIG. 5 shows a gas turbine engine according to an exemplary embodiment of the present invention.

FIG. 5 shows a gas turbine engine 10 comprising the bearing device 100 as shown in FIG. 1 to FIG. 4.

The gas turbine engine 10 is shown in a sectional view. The gas turbine engine 10 comprises, in flow series, an inlet 12, a compressor section 14, a combustor section 16 and a turbine section 18 which are generally arranged in flow series and generally in the direction of a longitudinal or rotational axis 20. The gas turbine engine 10 further comprises the shaft 103 which is rotatable about the rotational axis 20 and which extends longitudinally through the gas turbine engine 10. The shaft 103 drivingly connects the turbine section 18 to the compressor section 12.

In operation of the gas turbine engine 10, air 24, which is taken in through the air inlet 12 is compressed by the compressor section 12 and delivered to the combustion section or burner section 16. The burner section 16 comprises a burner plenum 26, one or more combustion chambers 28 defined by a double wall can 27 and at least one burner 30 fixed to each combustion chamber 28. The combustion chambers 28 and the burners 30 are located inside the burner plenum 26. The compressed air passing through the compressor 12 enters a diffuser 32 and is discharged from the diffuser 32 into the burner plenum 26 from where a portion of the air enters the burner 30 and is mixed with a gaseous or liquid fuel. The air/fuel mixture is then burned and the combustion gas 34 or working gas from the combustion is channeled via a transition duct 35 to the turbine section 18.

The turbine section 18 comprises a number of blade carrying discs 36 attached to the shaft 22. In the present example, two discs 36 each carry an annular array of turbine blades 38. However, the number of blade carrying discs could be different, i.e. only one disc or more than two discs. In addition, guiding vanes 40, which are fixed to a stator 42 of the gas turbine engine 10, are disposed between the turbine blades 38. Between the exit of the combustion chamber 28 and the leading turbine blades 38 inlet guiding vanes 44 are provided.

The combustion gas from the combustion chamber 28 enters the turbine section 18 and drives the turbine blades 38 which in turn rotates the shaft 103. The guiding vanes 40, 44 serve to optimise the angle of the combustion or working gas on to the turbine blades 38. The compressor section 12 comprises an axial series of guide vane stages 46 and rotor blade stages 48.

The shaft 103 is supported by at least two bearing devices 100 as shown in FIG. 1 to FIG. 4.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS 10 gas turbine engine
12 inlet
14 compressor section
16 combustor section
18 turbine section
20 rotational axis
24 air
26 burner plenum
28 combustor chamber
30 burner
32 diffuser
34 combustor gas
35 transition duct
36 disc
38 turbine blade
40 guiding vanes
42 stator
44 guiding vanes
46 guide vane stage
48 rotor blade stage
100 bearing device
101 circumferential direction
102 axial direction
103 rotor stub shaft
104 bearing housing element
110 first support disk
111 first tilting pad
112 first support surface
113 oil lubrication nozzle
114 blanked nozzle
115 first half
116 second half
210 second support disk
211 second tilting pad
212 second support surface
213 further oil lubrication nozzle
214 further blanked nozzle
301 first axial thrust
302 second axial thrust
303 first thrust collar
304 second thrust collar
305 intermediate disk
306 lubricant inlet
401 journal pad

The invention claimed is:

1. A bearing device for supporting a shaft of a gas turbine engine, the bearing device comprising
a bearing housing element,
a first support disk which is mounted to the bearing housing element,
first tilting pads, which are tiltably arranged one after another along a circumferential direction and secured to the first support disk in a manner that prevents movement of the first tilting pads in an axial direction,
a second support disk which is mounted to the bearing housing element spaced apart from the first support disk along the axial direction,
second tilting pads, which are tiltably arranged one after another along the circumferential direction and secured to the second support disk in a manner that prevents movement of the second tilting pads in the axial direction, wherein the first tilting pads are arranged with respect to a first thrust collar mounted to the shaft such that a first axial thrust is transferrable from the first thrust collar to the first tilting pads, and wherein the second tilting pads are arranged with respect to a second thrust collar mounted to the shaft such that a second axial thrust which is orientated in opposite direction with respect to the first axial thrust is transferrable from the second thrust collar to the second tilting pads, wherein a first number of the first tilting pads is greater than the half of a second number of the second tilting pads but smaller than the second number of the second tilting pads, wherein the first tilting pads define a first axial thrust capacity and the second tilting pads define a second axial thrust capacity that is different than the first axial thrust capacity, wherein the first tilting pads are unequally distributed onto a first support surface of the first support disk along the circumferential direction, and wherein the second tilting pads are equally distributed onto a second support surface of the second support disk along the circumferential direction.

2. The bearing device according to claim 1, further comprising at least three journal pads which are mounted to the first support disk and the second support disk spaced apart from each other along the circumferential direction, wherein the at least three journal pads are arranged between the first support disk and the second support disk such that a radial force is transferrable between the at least three journal pads and the shaft and such that the shaft is rotatable with respect to the at least three journal pads.

3. The bearing device according to claim 1, wherein the first support disk comprises at least one spacer element which protrudes from the first support surface along the axial direction, and wherein each spacer element of the at least one spacer element is arranged between two adjacent first tilting pads of the first tilting pads for preventing a contact of the two adjacent first tilting pads.

4. The bearing device according to claim 3, wherein the at least one spacer element is a blanked nozzle.

5. The bearing device of claim 4, further comprising:

plural gaps between the first tilting pads, wherein a first gap of the plural gaps is larger than a second gap of the plural gaps, wherein the at least one spacer element is disposed at a leading edge of the first gap with respect to a direction of rotation of the first thrust collar.

6. The bearing device according to claim 3, wherein the at least one spacer element is an oil lubrication nozzle for injecting oil such that a lubrication oil film between the first tilting pads and the first thrust collar is generatable.

7. The bearing device according to claim 1, wherein more than $2/3$ of the first tilting pads are arranged onto a first half of the first support disk and less than $1/3$ of the first tilting pads are arranged onto a second half of the first support disk.

8. The bearing device according to claim 1, wherein the first number of the first tilting pads is 6 to 11 and the second number of the second tilting pads is 12 to 21.

9. The bearing device of claim 1, further comprising:

plural gaps between the first tilting pads, wherein a first gap of the plural gaps is larger than a second gap of the plural gaps, wherein the bearing housing element protrudes into the first support disk at a location that is circumferentially aligned with the first gap and the first tilting pads.

10. A gas turbine engine, comprising the bearing device according to claim 1, a gas turbine housing, a shaft, the first thrust collar which is mounted to the shaft, the second thrust collar which is mounted to the shaft, wherein the first thrust collar is arranged spaced apart from the second thrust collar along the axial direction, and wherein the bearing housing element is mounted to the gas turbine housing.

* * * * *